(12) United States Patent
Kim et al.

(10) Patent No.: US 11,454,316 B2
(45) Date of Patent: Sep. 27, 2022

(54) CONTINUOUS VARIABLE TRANSMISSION HYDRAULIC PRESSURE CONTROL DEVICE

(71) Applicants: HYUNDAI MOTOR COMPANY, Seoul (KR); KIA MOTORS CORPORATION, Seoul (KR)

(72) Inventors: Young Joon Kim, Seoul (KR); Hyun Suk Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 84 days.

(21) Appl. No.: 17/038,149

(22) Filed: Sep. 30, 2020

(65) Prior Publication Data

US 2021/0364083 A1 Nov. 25, 2021

(30) Foreign Application Priority Data

May 19, 2020 (KR) ........................ 10-2020-0059603

(51) Int. Cl.
| | |
|---|---|
| *F16H 61/02* | (2006.01) |
| *F16H 61/70* | (2006.01) |
| *F16H 59/72* | (2006.01) |
| *F15B 11/16* | (2006.01) |
| *F15B 13/06* | (2006.01) |
| *F16D 48/02* | (2006.01) |
| *G05D 7/01* | (2006.01) |
| *G05D 16/20* | (2006.01) |
| *F16D 25/10* | (2006.01) |

(52) U.S. Cl.
CPC .......... *F16H 61/0206* (2013.01); *F15B 11/16* (2013.01); *F15B 13/06* (2013.01); *F16D 25/14* (2013.01); *F16D 48/0206* (2013.01); *F16H 59/72* (2013.01); *F16H 61/702* (2013.01); *G05D 7/0126* (2013.01); *G05D 16/2022* (2019.01); *F15B 2211/526* (2013.01); *F15B 2211/575* (2013.01); *F15B 2211/6343* (2013.01); *F15B 2211/6346* (2013.01); *F16D 25/10* (2013.01); *F16D 2048/0221* (2013.01)

(58) Field of Classification Search
CPC .. F16D 25/10; F16D 25/14; F16D 2048/0221; F16D 48/0206; F16H 61/0206; F16H 61/702
See application file for complete search history.

(56) References Cited

U.S. PATENT DOCUMENTS

2019/0275998 A1* 9/2019 Terai .................. F16H 61/12

FOREIGN PATENT DOCUMENTS

| CN | 106233042 A | * 12/2016 | ............. F16D 25/14 |
|---|---|---|---|
| CN | 107448595 A | * 12/2017 | ............. F16H 47/00 |
| KR | 10-2017-0068699 A | 6/2017 | |

\* cited by examiner

*Primary Examiner* — Stacey A Fluhart
(74) *Attorney, Agent, or Firm* — Lempia Summerfield Katz LLC

(57) ABSTRACT

A continuous variable transmission (CVT) hydraulic pressure control device includes: a pressure regulation valve regulating an operation pressure of oil supplied to a friction element of a forward-rearward device; and a switch valve to respectively switch oil discharge paths through which the oil supplied to the friction element is discharged, respectively by a pilot pressure from the pressure regulation valve and an elastic force of a return spring. In particular, the oil discharge paths switched by the switch valve have oil flow resistances different from each other.

8 Claims, 6 Drawing Sheets

CONTINUOUS VARIABLE TRANSMISSION HYDRAULIC PRESSURE CONTROL DEVICE

CROSS REFERENCE TO RELATED APPLICATION

This application claims priority to and the benefit of Korean Patent Application No. 10-2020-0059603, filed on May 19, 2020, the entire contents of which are incorporated herein by reference.

FIELD

The present disclosure relates to a continuous variable transmission (CVT) hydraulic pressure control device, and more particularly, to a technique for switching forward and rearward movement states of a continuous variable transmission (CVT) by hydraulic pressure.

BACKGROUND

The statements in this section merely provide background information related to the present disclosure and may not constitute prior art.

A continuous variable transmission (CVT) using a belt as a variator may be switched between a forward movement state and a rearward movement state by a transmission ratio continuously changed by changing a pulley ratio between a driving pulley and a driven pulley, and by hydraulic pressure provided to control rotation elements of a forward-rearward device connected to the driving pulley or the driven pulley using a friction element such as a clutch or brake.

It may be assumed that a forward friction element indicates a friction element that enables the forward-rearward device to implement the forward movement state of the CVT, and a rearward friction element indicates a friction element that enables the forward-rearward device to implement the rearward movement state of the CVT. Here, if provided with the hydraulic pressure, the CVT may be in the forward movement state (D stage) or the rearward movement state (R stage) by hydraulic pressure supplied to the forward friction element or the rearward friction element. Then, when the CVT is switched to a neutral (N) stage, the hydraulic pressure needs to be discharged at an appropriate speed from the forward friction element or the rearward friction element to which the hydraulic pressure was supplied.

If the speed at which the hydraulic pressure is discharged is too fast, a torque transmitted to a driving wheel may be suddenly discharged, thereby causing an impact such as a bump to a vehicle; and if the speed is too slow, the vehicle may be moved even in the N-stage.

This phenomenon may be greatly influenced by a change in oil viscosity based on a temperature of oil supplied to the forward friction element or the rearward friction element.

The contents described as the related art have been provided only for assisting in the understanding for the background of the present disclosure and should not be considered as corresponding to the related art known to those skilled in the art.

SUMMARY

The present disclosure provides a continuous variable transmission (CVT) hydraulic pressure control device preventing a vehicle from an unnecessary movement or impact by allowing hydraulic pressure supplied to a forward friction element or a rearward friction element of the CVT to be released at an appropriate speed despite a change in oil viscosity based on an oil temperature when the CVT is switched to a neutral (N) stage.

According to one form of the present disclosure, a continuous variable transmission (CVT) hydraulic pressure control device includes: a pressure regulation valve regulating an operation pressure of oil supplied to a friction element of a forward-rearward device; and a switch valve configured to respectively switch oil discharge paths through which the oil supplied to the friction element is discharged, by a pilot pressure from the pressure regulation valve and an elastic force of a return spring. In particular, the oil discharge paths switched by the switch valve are configured to have oil flow resistances different from each other.

The pressure regulation valve may be a solenoid valve; and a controller controlling the pressure regulation valve may be configured to regulate the pilot pressure supplied to the switch valve based on a temperature of the oil.

The switch valve may include: a first port to which the operation pressure from the pressure regulation valve is supplied, a second port connected to the friction element and a third port through which oil discharged from the friction element is discharged. In one form, the switch valve may be configured to be switched between a first state in which the second port and the third port are communicated with each other and a second state in which the first port and the second port are communicated with each other.

In one form, the return spring is configured to cause the switch valve to be in the first state, and when an elastic force of the return spring is overcome by the pilot pressure from the pressure regulation valve, the switch valve is switched to the second state.

The controller may be configured to control the pressure regulation valve to have the pilot pressure switching the switch valve to the second state when the oil temperature is a predetermined reference temperature or above.

The oil discharge path formed when the switch valve is in the first state may have smaller oil flow resistance than the oil discharge path formed when the switch valve is in the second state.

The switch valve may be installed between a manual valve and the friction element to supply the operation pressure from the pressure regulation valve to the friction element through the manual valve operated by a transmission lever.

The switch valve may be connected to the manual valve to receive the oil discharged from the friction element through the manual valve operated by the transmission lever and then to discharge the received oil.

The friction element of the forward-rearward device may be configured to include a forward friction element implementing a forward movement state and a rearward friction element implementing a rearward movement state; and at least one switch valve may be included in at least one of the forward friction element and the rearward friction element to switch the oil discharge paths.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
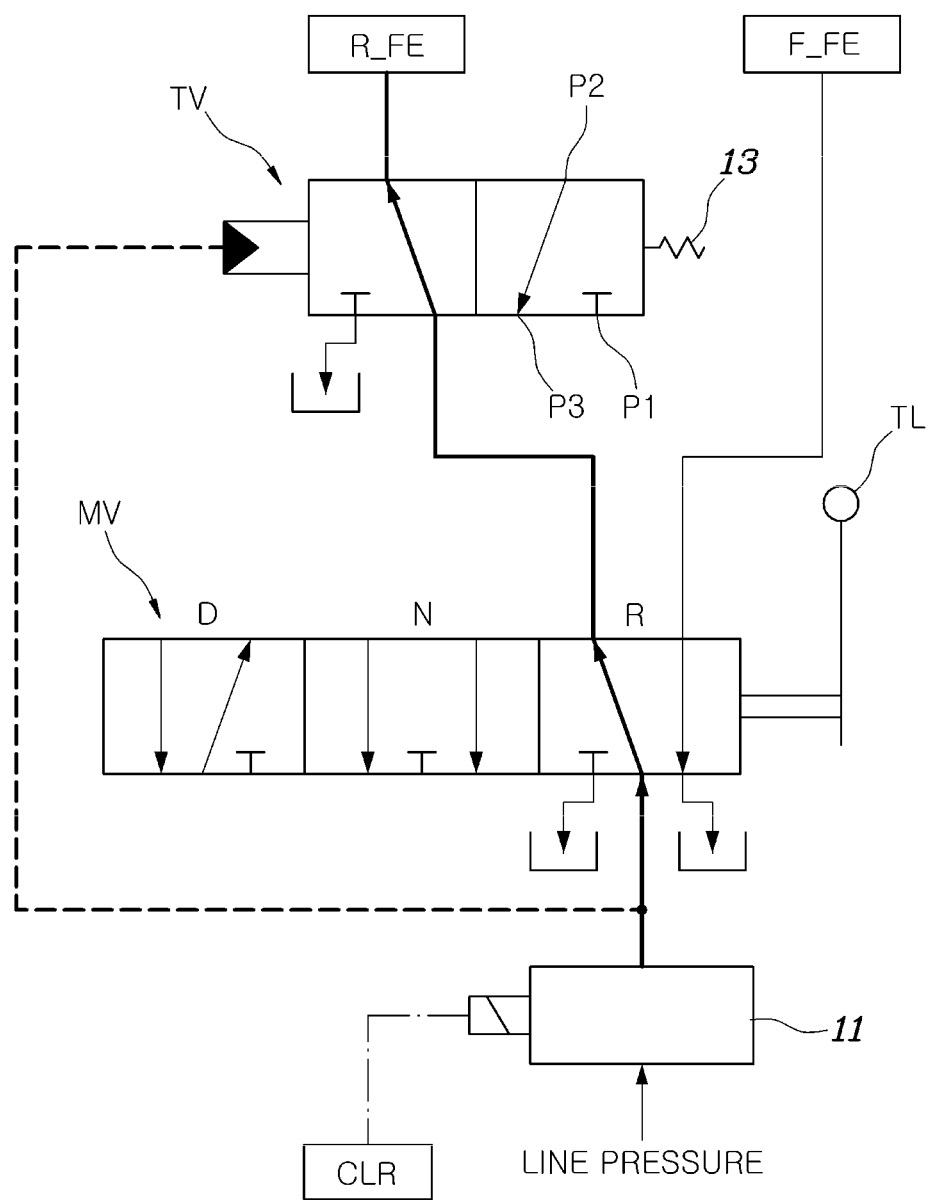
FIG. 1 is a view showing a first form of a continuous variable transmission (CVT) hydraulic pressure control device in one form of the present disclosure, showing a state in which a rearward (R) stage is implemented.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a continuous variable transmission (CVT) hydraulic pressure control device according to exemplary forms of the present disclosure is described with reference to the accompanying drawings.

Figure 6:
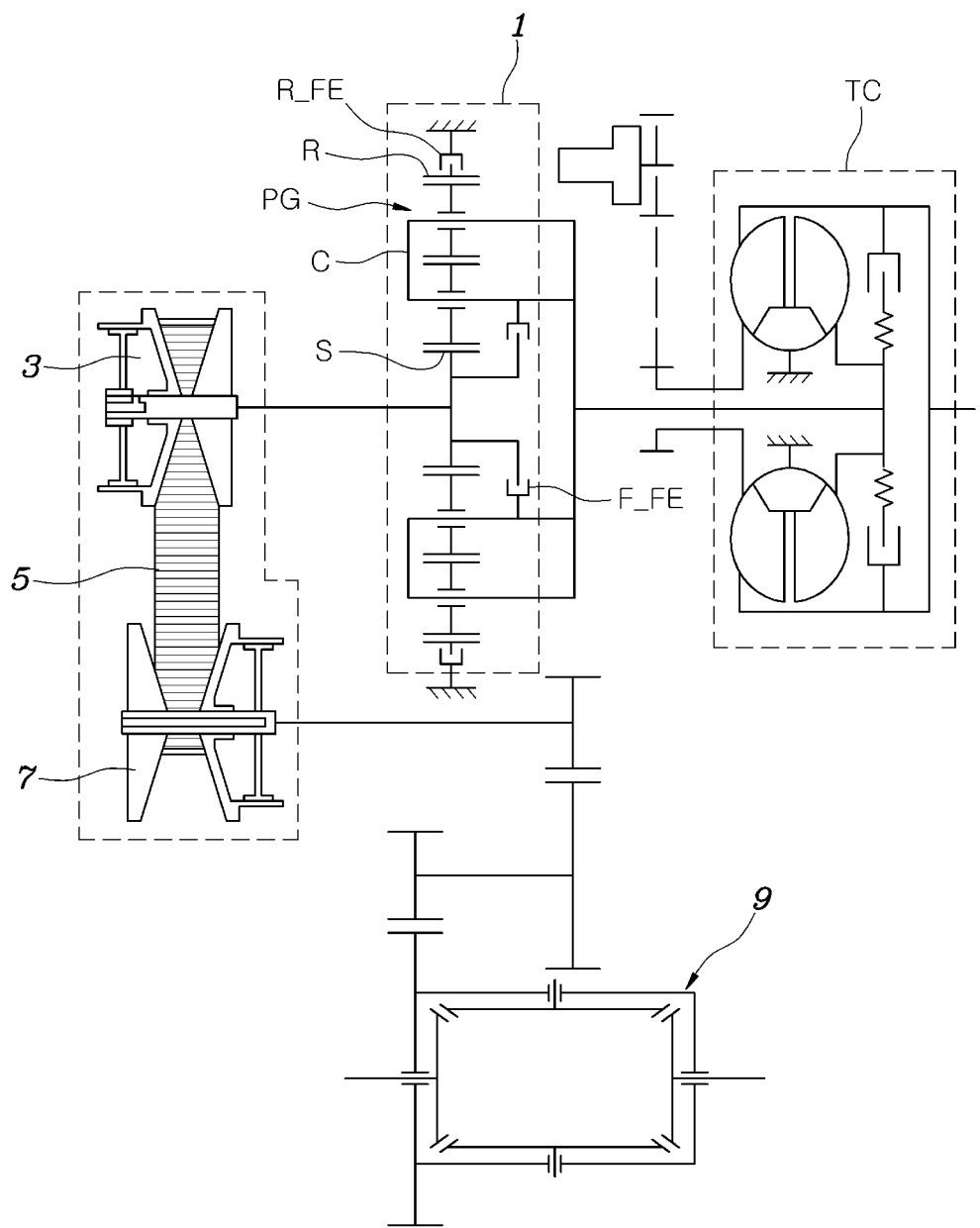
FIG. 6 is a view describing an example of a continuous variable transmission (CVT) to which the present disclosure may be applied.

FIG. 6 shows a structure of a continuous variable transmission (CVT) to which the present disclosure may be applied. The structure may be configured in a following manner: when power is input from a power source such as an engine through a torque converter (TC), the power may be transmitted to a driving pulley 3 through a forward-rearward device 1 including a planetary gear device (PG); the power transmitted to the driving pulley 3 may be transmitted to a driven pulley 7 through a belt 5; and then the power may be drawn to a drive wheel through a differential 9.

The forward-rearward device 1 may include a rearward friction element (R_FE) capable of fixing a ring gear (R) of the planetary gear device (PG) and a forward friction element (F_FE) capable of connecting a sun gear (S) with a carrier (C).

Referring to FIGS. 1 to 5, all forms of the present disclosure may be configured to commonly include: a pressure regulation valve 11 regulating an operation pressure of oil supplied to the friction element (FE) of the forward-rearward device 1; and a switch valve (TV) installed to switch paths through which the oil supplied to the friction element (FE) is discharged, respectively by a pilot pressure from the pressure regulation valve 11 and an elastic force of a return spring 13.

Here, the oil discharge paths switched by the switch valve (TV) may be configured to have oil flow resistance different from each other.

That is, in the present disclosure, in case that hydraulic pressure, supplied to the friction element of the forward-rearward device 1 and used to implement a forward movement state and a rearward movement state respectively in a drive (D) stage and a rearward (R) stage, is released when the CVT is switched to a neutral (N) stage and the oil is thus discharged, the oil may be discharged through one of the paths having different flow resistance from each other by the switch valve (TV). In this manner, it is possible to appropriately regulate a speed at which the hydraulic pressure is released from the friction element in which the speed is changed by a change in oil viscosity or the like, thereby preventing a vehicle from an unnecessary movement or impact.

As described above, the forward-rearward device 1 may include: the planetary gear device (PG) connected to the driving pulley 3 configuring a conventional CVT or the driven pulley; and the friction element (FE) such as a brake or clutch that restrains or connects the rotation elements of this planetary gear (PG).

The friction element (FE) may be configured of: the forward friction element (F_FE) that enables the forward movement by the hydraulic pressure provided thereto; and the rearward friction element (R_FE) that enables the rearward movement by the hydraulic pressure provided thereto.

The pressure regulation valve 11 may be a solenoid valve, and a controller (CLR) controlling the pressure regulation valve 11 may be configured to regulate the pilot pressure supplied to the switch valve (TV) based on a temperature of the oil.

Like a conventional CVT hydraulic control device, the pressure regulation valve 11 may be configured to receive line pressure famed by an oil pump and a regulator valve, and be driven by an electrical signal from the controller (CLR) to regulate and provide appropriate hydraulic pressure to the friction element.

When the CVT is switched from the neutral (N) stage to the D stage for the forward movement or the R stage for the rearward movement, the pressure regulation valve 11 may appropriately regulate and supply the hydraulic pressure to the forward friction element (F_FE) or the rearward friction element (R_FE), thereby enabling a smooth switch without the impact.

Figure 2:
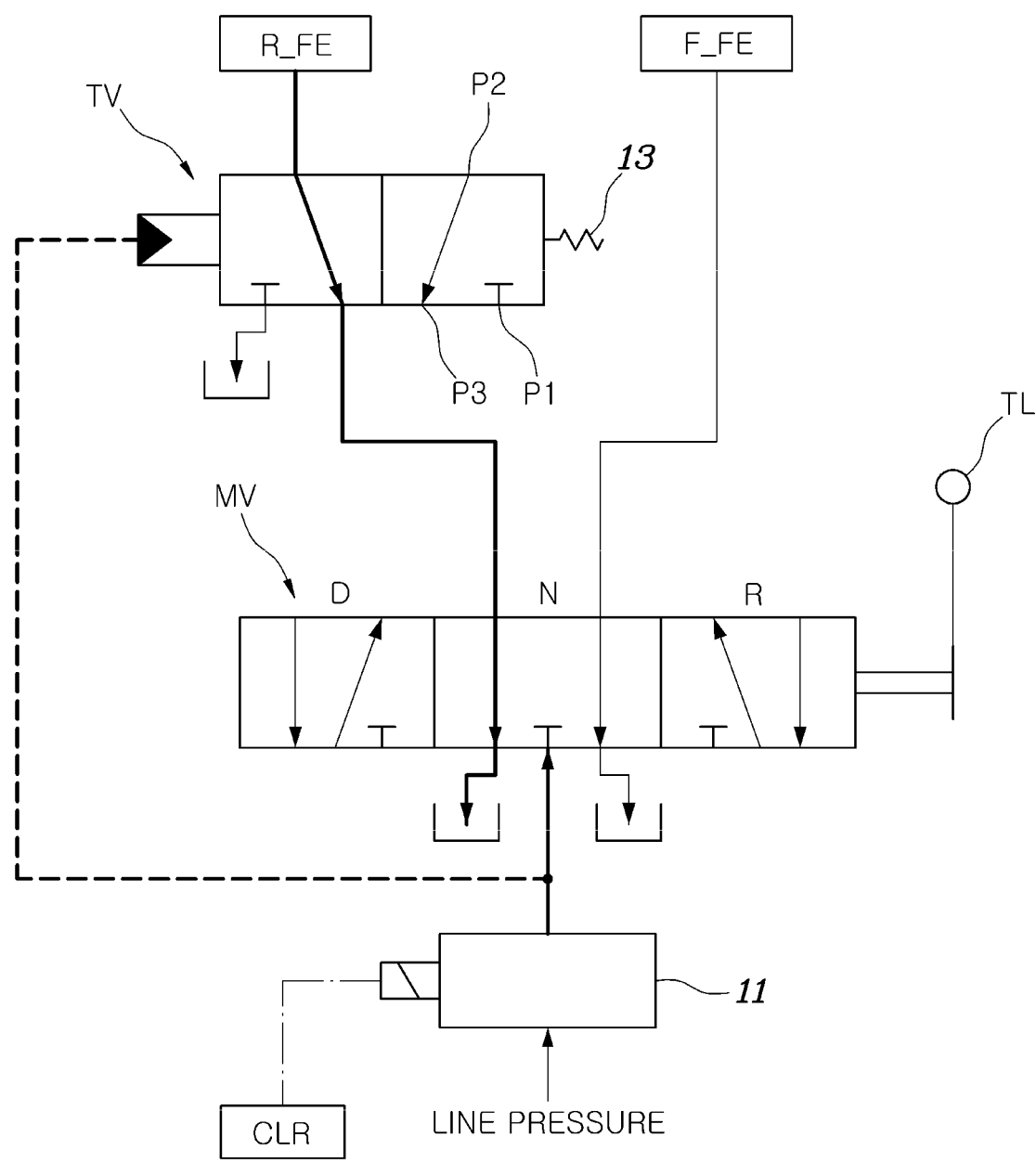
FIG. 2 is a view describing that the form of FIG. 1 is switched to a neutral (N) stage under a high temperature condition and oil is thus discharged from a rearward friction element.

Here, for reference, the operation pressure may indicate the hydraulic pressure supplied by the pressure regulation valve 11 to the forward friction element (F_FE) or the rearward friction element (R_FE), and the pilot pressure may indicate the hydraulic pressure supplied to operate the switch valve (TV). FIG. 1 shows a situation in which the operation pressure and the pilot pressure are supplied simultaneously, and FIG. 2 shows a situation in which only the pilot pressure is supplied.

The switch valve (TV) may include a first port P1 to which the operation pressure from the pressure regulation valve 11 is supplied, a second port P2 connected to the friction element and a third port P3 discharging oil discharged from the friction element, and the switch valve may be configured to be switched between a first state in which the second port P2 and the third port P3 are communicated with each other and a second state in which the first port P1 and the second port P2 are communicated with each other.

The switch valve (TV) may be configured to have the first state by the return spring 13, and have the second state by overcoming the elastic force of the return spring 13 by the pilot pressure from the pressure regulation valve 11.

The controller (CLR) may be configured to control the pressure regulation valve 11 to have the pilot pressure switching the switch valve (TV) to the second state when the oil temperature is a predetermined reference temperature or above.

The controller (CLR) may receive information on the oil temperature directly from a separate oil temperature sensor or receive the information on the oil temperature from another controller, etc. The reference temperature may be set to a level to distinguish whether or not the unnecessary movement of the vehicle may occur in the N stage due to a speed which becomes slower than a general oil-discharge speed when the oil is discharged from the friction element. The reference temperature may be determined by experiments and analyses.

The oil discharge path formed when the switch valve (TV) is in the first state may have smaller oil flow resistance than the oil discharge path formed when the switch valve (TV) is in the second state.

That is, the oil discharge path formed when the switch valve (TV) is in the first state may have smaller oil flow resistance than the oil discharge path formed when the switch valve (TV) is in the second state because the pilot pressure does not act due to the oil temperature below the reference temperature, and therefore, the oil may be discharged more smoothly even when having higher viscosity. Accordingly, the friction element may have the following speeds famed almost similar to each other: a speed at which the hydraulic pressure is released when the switch valve (TV) is in the second state at the reference temperature or above; and a speed at which the hydraulic pressure is released when the switch valve (TV) is in the first state at a temperature below the reference temperature.

Therefore, the oil discharge path formed in the second state may be configured to have the flow resistance at a level in which the impact does not occur because the speed at which the hydraulic pressure is released from the friction element is not too fast when the CVT is switched to the N stage in a normal situation where the oil temperature is the reference temperature or above.

Here, a magnitude of the flow resistance in the oil discharge path may be implemented by regulating a minimum flow cross-sectional area of each path. That is, for example, at least a portion of the oil discharge path formed when the switch valve (TV) is in the second state may be implemented to include an orifice having a smaller cross-sectional area than any portion of the oil discharge path formed in the first state, etc.

The orifice having the above structure may be installed at any position on the oil discharge path formed when the switch valve (TV) is in the second state.

Figure 3:
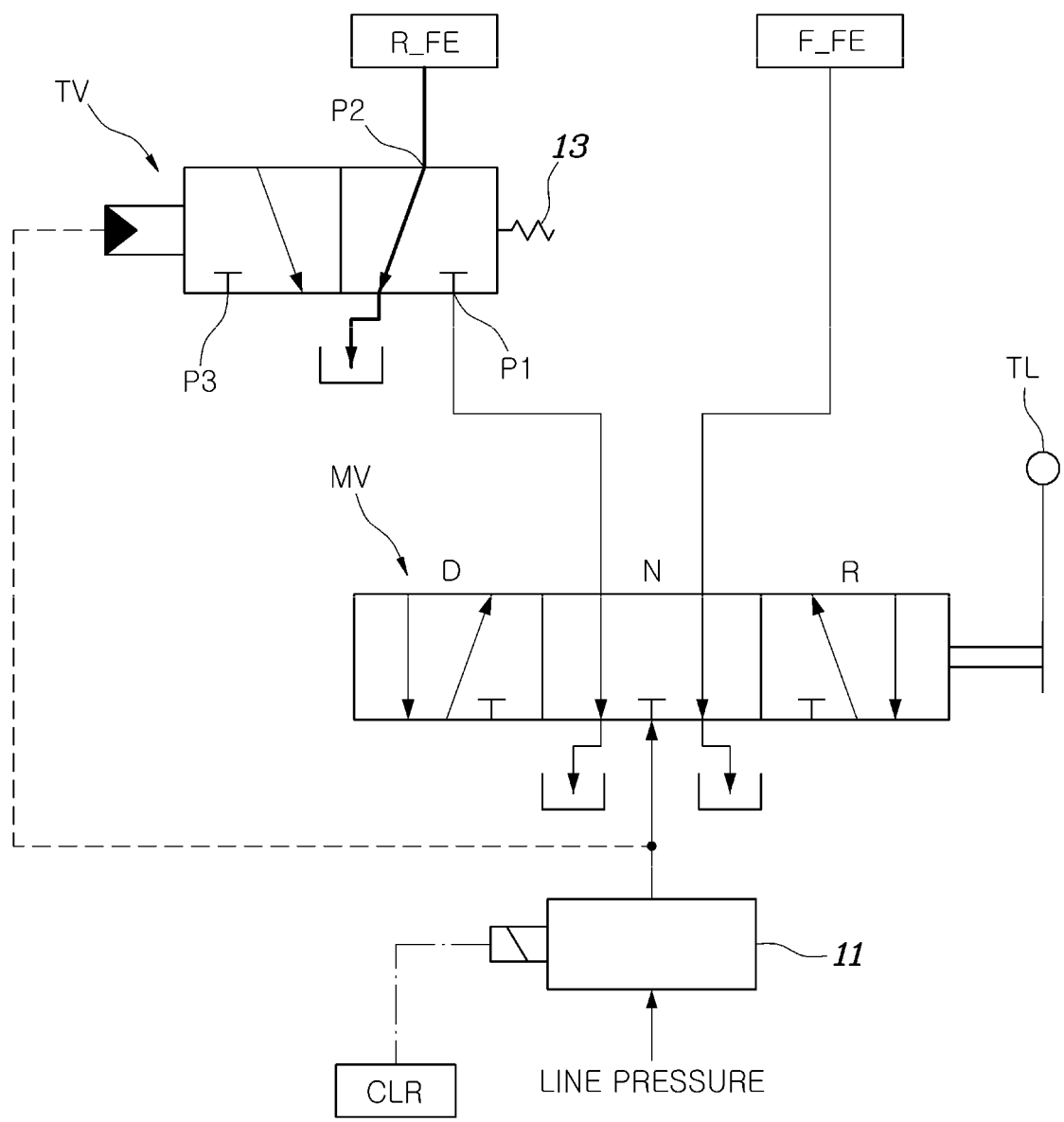
FIG. 3 is a view describing that the form of FIG. 1 is switched to a neutral (N) stage under a low temperature condition and oil is thus discharged from a rearward friction element.

The above configuration is common to all the exemplary forms of the present disclosure. FIGS. 1 to 3 show the first form in which the switch valve (TV) is installed between a manual valve (MV) and the friction element to supply the operation pressure from the pressure regulation valve 11 to the friction element through the manual valve (MV) operated by a transmission lever (TL).

For reference, the manual valve (MV) may further include an option of a parking state (P stage).

Figure 4:
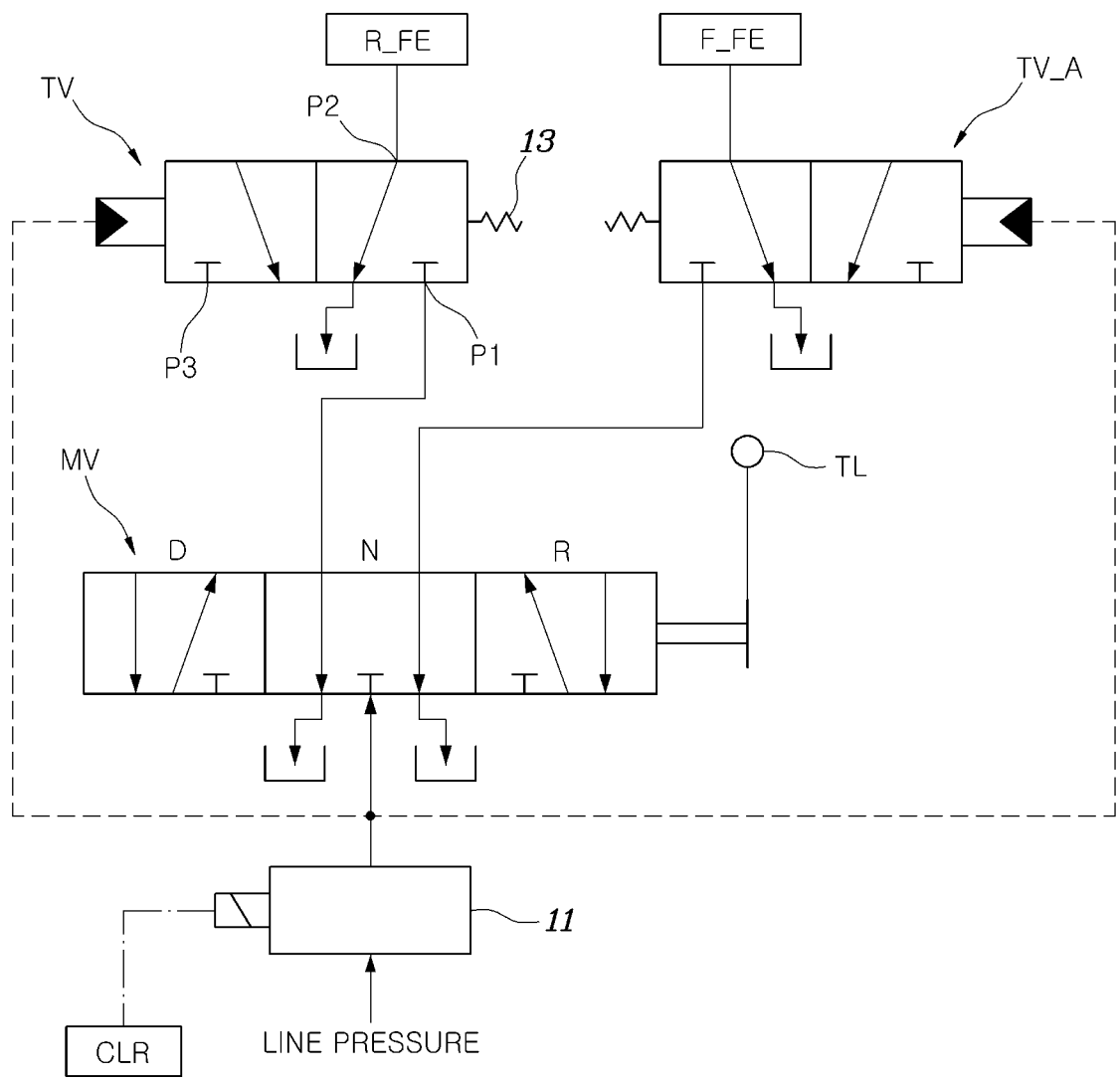
FIG. 4 is a view showing a second form of a continuous variable transmission (CVT) hydraulic pressure control device according to another form of the present disclosure.

Meanwhile, at least one switch valve (TV) may be included in at least one of the forward friction element (F_FE) and the rearward friction element (R_FE) to switch the oil discharge paths. FIG. 4 shows the second form in which a total of two switch valves are provided including an additional switch valve (TV A), thereby switching the discharge paths of the oil discharged from the forward friction element (F_FE) as well as from the rearward friction element (R_FE).

Figure 5:
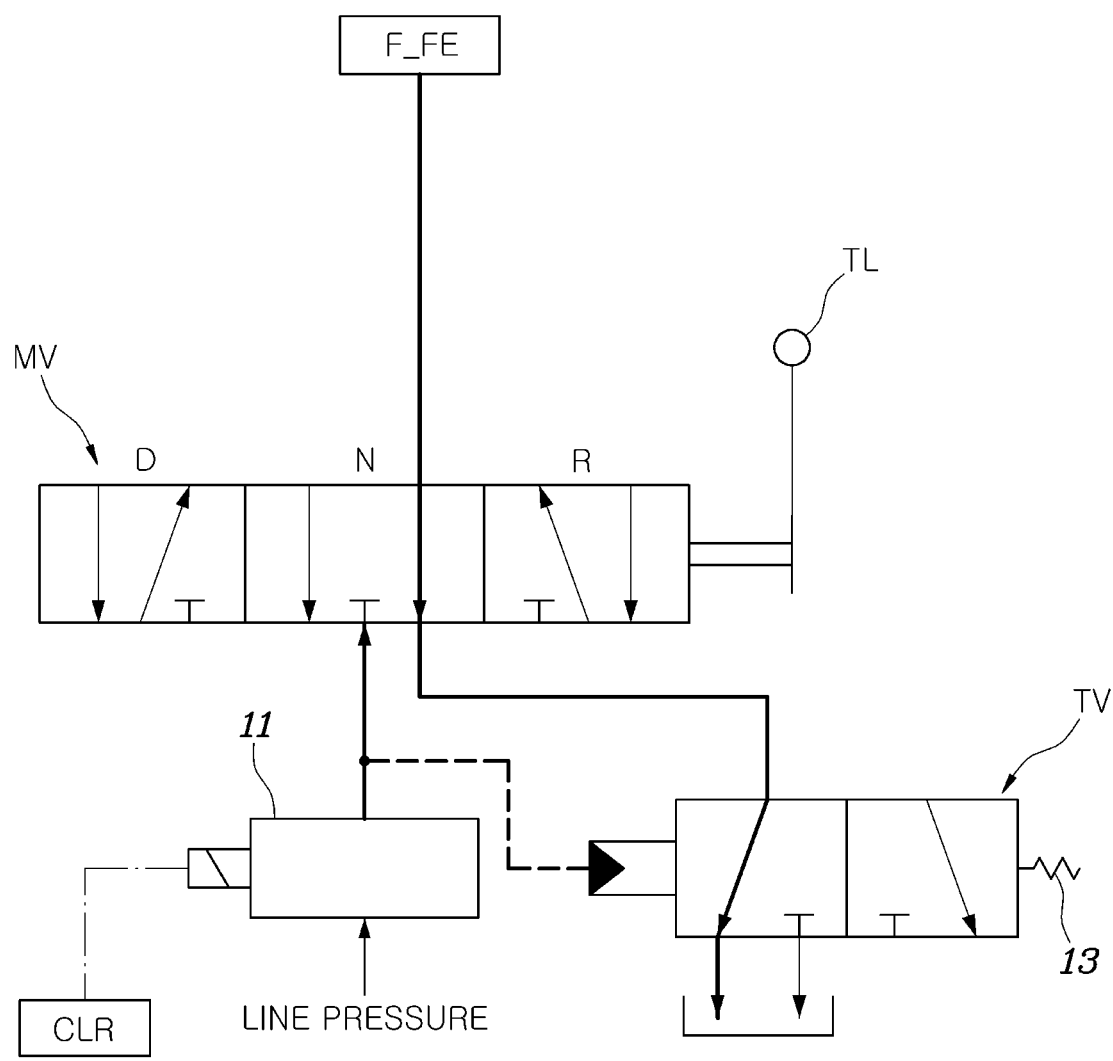
FIG. 5 is a view showing a third form of a continuous variable transmission (CVT) hydraulic pressure control device according to one form of the present disclosure.

In addition, FIG. 5 shows the third form of the present disclosure in which the switch valve (TV) is connected to the manual valve (MV) to receive the oil discharged from the friction element through the manual valve (MV) operated by the transmission lever (TL) and then to discharge the received oil.

Hereinafter, an operation of the present disclosure is described based on the first form of FIGS. 1 to 3.

FIG. 1 shows a state in which the manual valve (MV) selects the R stage and the operation pressure of the pressure regulation valve 11 is supplied to the rearward friction element (R_FE), thereby implementing the rearward movement of the vehicle.

Here, the pilot pressure supplied from the pressure regulation valve 11 to the switch valve (TV) may allow the switch valve (TV) to have the second state, and the hydraulic pressure supplied through the manual valve (MV) may be provided to the rearward friction element (R_FE) through the first port P1 and the second port P2.

When a driver operates the transmission lever (TL) in the rearward movement state as described above to switch the manual valve (MV) to the N stage, the state may be switched to the state shown in FIG. 2 or the state shown in FIG. 3.

That is, when the oil temperature is under a condition of a higher temperature which is the reference temperature or above, the controller (CLR) may drive the pressure regulation valve 11 so that the pilot pressure allows the switch valve (TV) to continuously maintain the second state as shown in FIG. 2. When the oil temperature is under a condition of a lower temperature which is below the reference temperature, the pilot pressure may not be provided or provided to act only at a level in which the pilot pressure cannot overcome the elastic force of the return spring 13, thereby allowing the switch valve (TV) to have the first state as shown in FIG. 3.

The oil discharge path through which the oil of the rearward friction element (R_FE) is discharged and which is famed when the switch valve (TV) has the first state may have smaller flow resistance than the oil discharge path famed when the switch valve (TV) has the second state. Therefore, the oil of the rearward friction element (R_FE) may be smoothly discharged even in the lower temperature condition where the oil viscosity is higher, thereby effectively preventing the unnecessary movement of the vehicle in the N stage.

The present disclosure may prevent the vehicle from the unnecessary movement or impact by allowing the hydraulic pressure supplied to the forward friction element or the rearward friction element of the continuous variable transmission (CVT) to be released at an appropriate speed despite the change in the oil viscosity based on the oil temperature when the CVT is switched to the neutral (N) stage, and may implement such a function at a very low cost.

Although the present disclosure is shown and described with respect to the exemplary forms, it is obvious to those skilled in the art that the present disclosure may be variously modified and altered without departing from the spirit of the present disclosure.

What is claimed is:

1. A continuous variable transmission (CVT) hydraulic pressure control device comprising:
   a pressure regulation valve configured to regulate an operation pressure of oil supplied to a friction element of a forward-rearward device; and
   at least one switch valve configured to respectively switch oil discharge paths by a pilot pressure from the pressure regulation valve and an elastic force of a return spring,
   wherein:
   the oil supplied to the friction element is discharged through the oil discharge paths, and the oil discharge paths switched by the at least one switch valve are configured to have oil flow resistances different from each other, and wherein:

the pressure regulation valve is a solenoid valve, and a controller is configured to: control the pressure regulation valve and regulate the pilot pressure supplied to the at least one switch valve based on a temperature of the oil.

2. The CVT hydraulic pressure control device of claim 1, wherein the at least one switch valve includes:

a first port to which the operation pressure from the pressure regulation valve is supplied, a second port connected to the friction element, and a third port through which oil discharged from the friction element is discharged, and wherein the at least one switch valve is configured to be switched between a first state in which the second port and the third port are communicated with each other and a second state in which the first port and the second port are communicated with each other.

3. The CVT hydraulic pressure control device of claim 2, wherein:

the return spring is configured to cause the at least one switch valve to in the first state, and when an elastic force of the return spring is overcome by the pilot pressure from the pressure regulation valve, the at least one switch valve is switched to the second state.

4. The CVT hydraulic pressure control device of claim 3, wherein when a temperature of the oil is equal to or higher than a predetermined reference temperature, the controller is configured to control the pressure regulation valve to cause the pilot pressure to switch the at least one switch valve to the second state.

5. The CVT hydraulic pressure control device of claim 4, wherein a first oil discharge path formed when the at least one switch valve is in the first state has an oil flow resistance lower than an oil flow resistance of a second oil discharge path formed when the at least one switch valve is in the second state.

6. The CVT hydraulic pressure control device of claim 1, wherein the friction element of the forward-rearward device includes: a forward friction element implementing a forward movement state, and a rearward friction element implementing a rearward movement state; and the at least one switch valve includes: a first switch valve included in the forward friction element and a second switch valve included in the rearward friction element and configured to switch the oil discharge paths.

7. A continuous variable transmission (CVT) hydraulic pressure control device comprising:

a pressure regulation valve configured to regulate an operation pressure of oil supplied to a friction element of a forward-rearward device; and a switch valve configured to respectively switch oil discharge paths by a pilot pressure from the pressure regulation valve and an elastic force of a return spring, wherein:

the oil supplied to the friction element is discharged through the oil discharge paths, and the oil discharge paths switched by the switch valve are configured to have oil flow resistances different from each other, and wherein the switch valve is installed between a manual valve and the friction element and configured to supply the operation pressure from the pressure regulation valve to the friction element through the manual valve operated by a transmission lever.

8. A continuous variable transmission (CVT) hydraulic pressure control device comprising:

a pressure regulation valve configured to regulate an operation pressure of oil supplied to a friction element of a forward-rearward device; and a switch valve configured to respectively switch oil discharge paths by a pilot pressure from the pressure regulation valve and an elastic force of a return spring, wherein:

the oil supplied to the friction element is discharged through the oil discharge paths, and the oil discharge paths switched by the switch valve are configured to have oil flow resistances different from each other, and wherein the switch valve is connected to a manual valve and configured to receive the oil discharged from the friction element through the manual valve operated by a transmission lever and then discharge the received oil.

* * * * *